Dec. 30, 1924.  
J. P. BALDWIN  
SHOCK ABSORBER  
Filed April 15, 1919
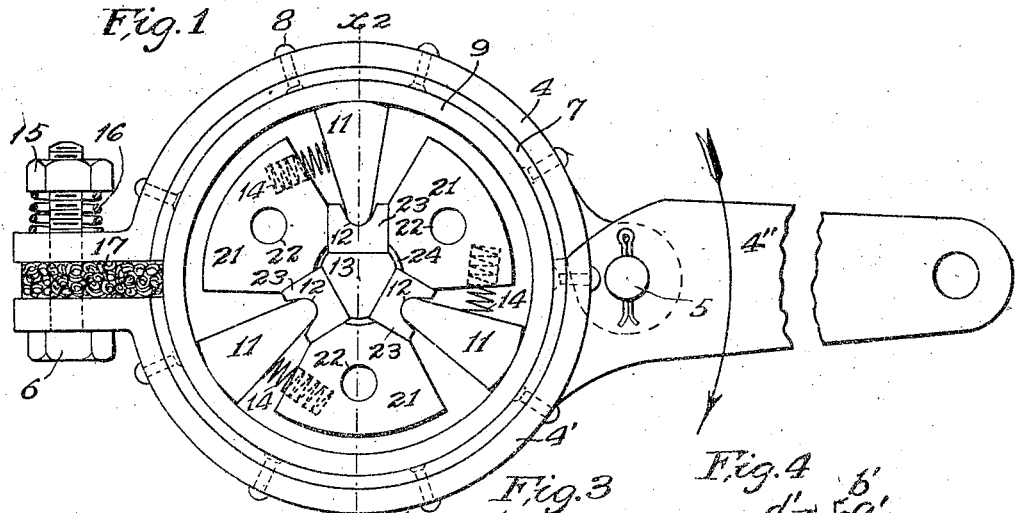
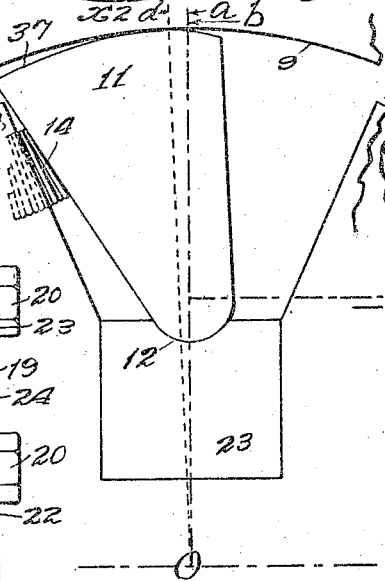
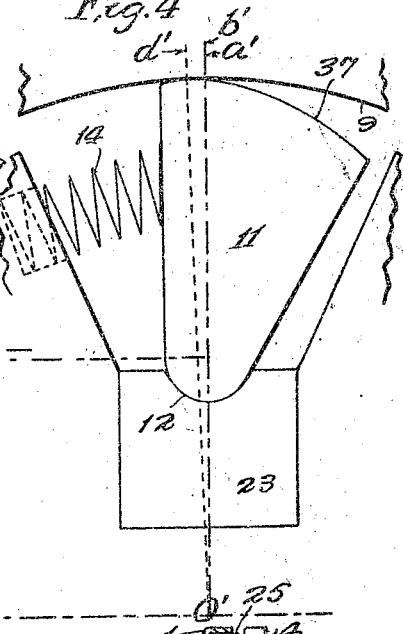
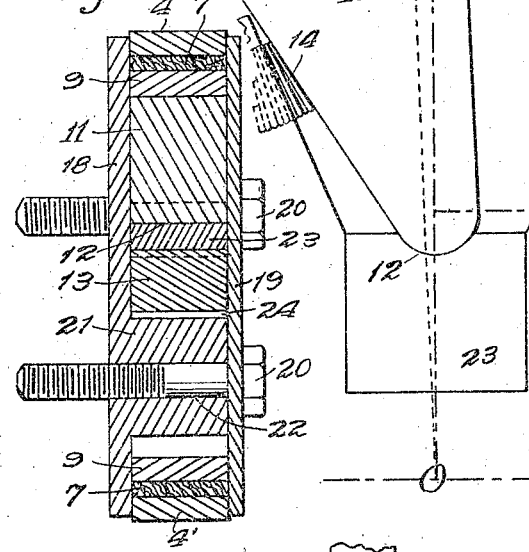
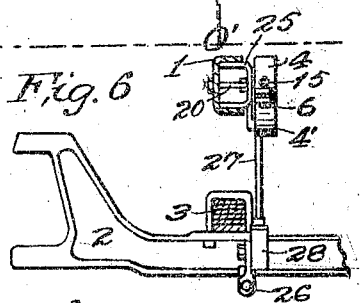
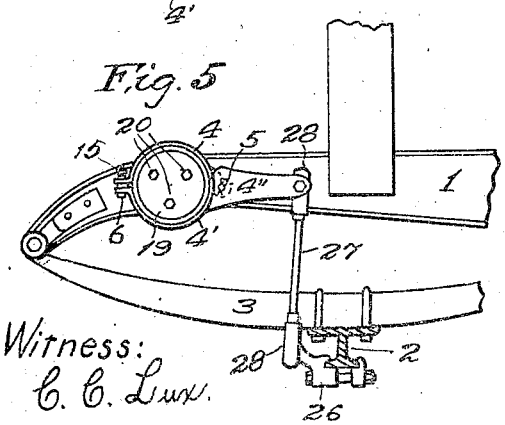
Inventor:
James Pierce Baldwin
by
James R. Townsend
his Atty.
Witness:
C. C. Lux.

Dec. 30, 1924.

J. P. BALDWIN

SHOCK ABSORBER

Filed April 15, 1919   2 Sheets-Sheet 2

1,521,589

Witness:
C. C. Lux.

Inventor:
James Pierce Baldwin.
by James R. Townsend
his Atty.

Patented Dec. 30, 1924.

1,521,589

UNITED STATES PATENT OFFICE.

JAMES PIERCE BALDWIN, OF LOS ANGELES, CALIFORNIA.

SHOCK ABSORBER.

Application filed April 15, 1919. Serial No. 290,308.

*To all whom it may concern:*

Be it known that I, JAMES PIERCE BALDWIN, a citizen of the United States, residing at Los Angeles, in the county of Los Angeles and State of California, have invented a new and useful Improvement in Shock Absorbers, of which the following is a specification.

This invention relates to shock absorbers of the type employing an oscillating arm and adapted to dampen only the rebound of the vehicle springs and allowing the compression of the springs to be practically free.

An object of this invention is to provide a shock absorber of said type which will practically offer no resistance to spring compression; thus controlling spring action on rough roads without causing hard riding on smooth roads.

A further object is to provide a device of this character which is adapted to adjustment to a definite resistance and is adapted to maintain such adjustment indefinitely.

The invention is broadly new, basic, primary and pioneer in that it comprises in combination, an oscillating friction ring, and a rigid creeping ring frictionally engaging the friction ring and having a practically constant frictional co-efficient; and friction pawl engaging said creeping ring and adapted to leave the creeping ring free to move with the oscillating ring during compression of the spring and adapted to positively grip the creeping ring to prevent it from rotating as the oscillating ring returns; so that recoil of the spring is met by a constantly uniform resistance in so far as the frictional operating device is concerned.

An object of the invention is to provide means whereby instantaneous positive locking in one direction and instantaneous release in the other direction is always assured. In this regard an object is to provide a ring-locking moving strut that compensates for the wear of the clutch members without changing the angle of force thus to maintain the positive and instantaneous alternate locking and releasing functions unimpaired and unchanged throughout the life of the device.

An object of the invention is to make provision whereby the wear between the friction-producing friction pawls and the frictional element co-acting therewith will be reduced to a minimum and uneven wear will be prevented.

A feature of this invention is a novel construction and adaptation of a friction strut having an involute contact face which involves to some extent the principle set forth in my application Serial No. 246,408 for Letters-Patent on sliding clutch filed July 22, 1918. The object in this present invention is to provide a friction pawl which does all the compensating for wear without the necessity of any manual adjustments. In order to accomplish this, however, it is necessary that the clutch of the shock absorber shall lock at any and every speed; the frictional compensation being effected by the oscillation of the oscillating ring upon the creeping ring when such locking takes place between the creeping ring and the friction pawls.

Further objects, advantages and features of the invention may appear from the accompanying drawings, the following detailed description and the appended claims.

The accompanying drawings illustrate the invention.

Figure 1 is a side elevation of the working parts of the clutch.

Fig. 2 is a section on line $x^2$ Fig. 1.

Fig. 3 illustrates the position of one of the wear-compensating pawls before wear has occurred in the operative parts.

Fig. 4 illustrates the position of the pawl after wear has taken place.

Fig. 5 is a side elevation of the invention applied to the front of a motor vehicle to illustrate its use.

Fig. 6 is a front view illustrative of the same.

Figure 7:
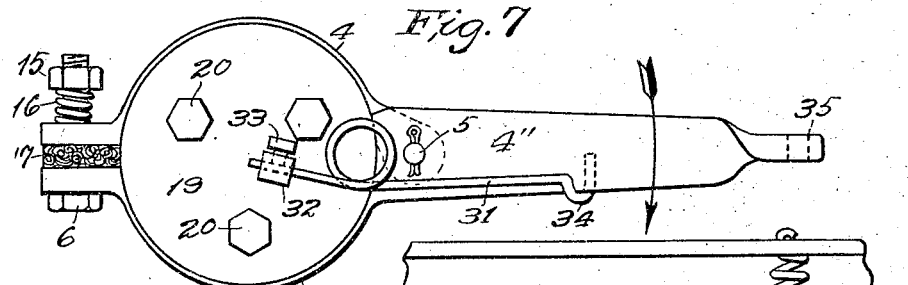
Fig. 7 illustrates a modified form of the invention.

Referring to the drawings; 1 designates one of the side members of a vehicle frame, 2 an axle, and 3 one of the springs which yieldingly supports the frame from the axle.

Referring to the friction device, the oscillating friction ring is preferably made in two parts, 4 and 4', pivoted together on the pin 5 and adjustable by the bolt 6. Part 4' is provided with an arm 4". 7 represents a suitable friction material, preferably leather treated with some lubricant such as oleostearine, and riveted to the members 4 and 4' by the rivets 8, 9 represents a one piece, constant form, hardened steel, constant-friction creeping or floating ring which has concentric circular outer and inner surfaces and which engages on its outer surface with the friction material 7, and on its inner surface with the pawls 11, which will hereinafter be more particularly described. 12 represents the three hardened pawl seats in which the lower ends of the pawls 11 rockingly articulate. 13 is a triangular shaped spacer which acts as a self-centering abutment for the pawl seats 12. 14 represents the three coil springs which serve to keep the pawls in operative position with reference to the ring 9. The bolt 6 binds the parts 4 and 4' with lining 7 against the creeping ring 9 and thereby creates the proper frictional resistance between those parts. 15 represents the nut for tightening the bolt 6, and 16 represents the spring which serves to compensate for wear and to control the pressure between the friction material 7 and the outer surface of the creeping ring 9. 17 represents a felt block which serves to keep dirt and water from collecting on the friction surfaces.

The members above referred to are held in place by the base member 18 and the cover plate 19; the two being bolted together by the three cap screws 20, which extend through the base 18 and serve for attaching the base member to the vehicle frame member 1 or to some suitable fitting.

The base member 18 has three lugs 21 which serve to properly space the distance between the base 18 and the cover plate 19. In the three lugs are the three threaded holes 22 for the cap-screws 20. The three lugs are separated by three evenly spaced radial-ways 23, which accommodate the pawl seats 12 and which connect with the center well 24. The center well 24 is made sufficiently large to permit self-centering by the abutment 13.

A common method of attaching and operating the invention is illustrated in Figs. 5 and 6 which show the base 18 bolted directly to the frame member 1 through the frame filler 25 by means of the cap screws 20. The arm 4" is connected below to a suitable axle clamp 26 by the connecting rod 27 which has ball and socket joints 28 at each end thereof.

Figure 8:
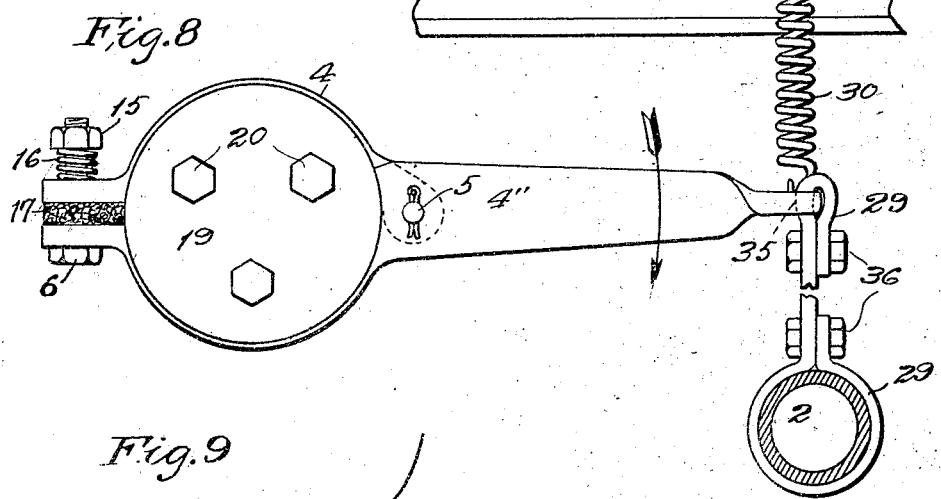
Fig. 8 illustrates another modified form of the invention.

In the modified forms illustrated in Figs. 7 and 8, a flexible strap connection 29 is shown for the operating connection instead of the solid rod 27. With the strap connection 29 it is necessary to provide means for keeping the member 4' of the friction ring in operative position or in other words, for keeping the strap taut. For this purpose, the releasing springs 30, 31 have been provided. The releasing spring 31 is fastened at one end to a lug 32 on the cover plate 19 and is held in place by set screw 33. The other end has a hook 34 which engages with the lower portion of the arm 4" of the friction ring member 4' and it will be seen from the drawing that the power exerted by spring 31 will serve to constantly force the arm 4" upward and thereby maintain tautness in the strap 29. The strap 29 is cut to a suitable length and one end is looped through the hole 35 in the end of arm 4", and the other end is looped around the axle 2. The looped ends are secured in place by suitable means, such as the bolts 36.

Figures 9, 10:
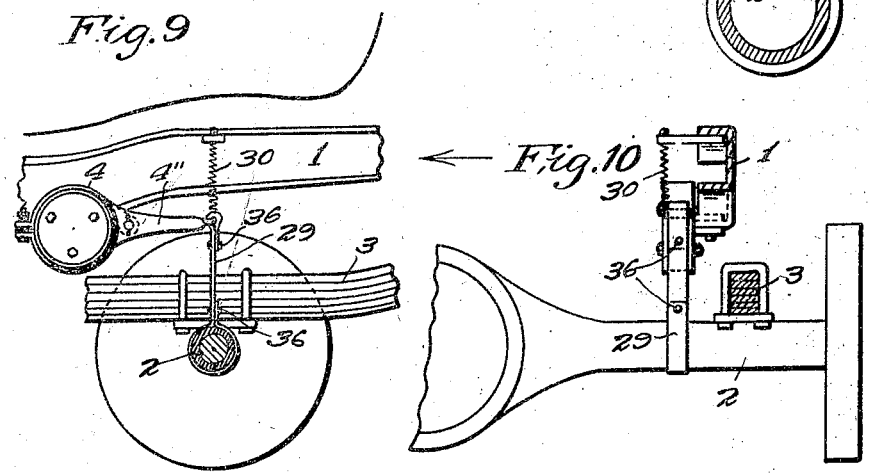
Figs. 9 and 10 illustrate the attachment of the modified form shown in Fig. 8.

The release spring shown in Figs. 8, 9 and 10, is somewhat different from that shown in Fig. 7, in that one end is attached to the frame member of the vehicle and the other end to the arm 4" at the hole 35. Its function will be clear from the above description and from the illustrations.

The pawl members 11 are made with an upper involute surface 37 and are located and formed so as to adapt them to compensate for wear without disturbing the angle of force or thrust. That is; the angle $a$ between the line of thrust $O-d$ and a line $O-b$ drawn normal to the center O, as shown in Fig. 3, illustrating the position of the contact point of pawl 11 in relation to the ring 9 when the parts are new, is exactly the same as the angle $a'$ formed by the line of thrust $O'$ $d'$ and the normal $O'$ $b'$ in Fig. 4, which illustrates the position of the contact point of the pawl 11 in reference to the constant form circular floating or creeping ring 9 after wear has taken place. The pawls 11 are so formed that the angle of thrust is well within the angle of repose for the members 9 and 11. The importance of this will be readily apparent for if the angle of thrust is too great, the members 9 and 11 will not frictionally engage and the invention would be inoperative. It is of equal importance, therefore, that the angle of thrust should not vary with any of the succeeding positions assumed by the pawl members as wear takes place in the device. This result has been accomplished by providing the involute surface 37, the successive radii of which are of such progressively increasing length as to accommodate wear; in other words, to compensate for the increasing distance between the seats 12 and the inside surface of the constant form circular floating ring 9; which increasing distance is brought about by wear, without disturbing the angle of thrust through the pawl members 11.

In operation, my invention is very simple. As an obstruction is encountered in the road, the axle 2 is forced upward and the spring 3 is compressed accordingly. The connecting rod 27 illustrated in Figs. 5 and 6, or the springs 30 and 31 shown in Figs. 7, 8, 9 and 10, cause the arm 4" to be oscillated in an upward direction. With movement in this direction, the friction between the rings 7 and 9 is sufficient to cause the creeping ring 9 to move freely on the pawls 11.

The opening, or recoil, of the vehicle springs 3, in a similar manner causes the arm 4" of the oscillating ring to oscillate in the opposite direction. Oscillation of the arm 4" in this opposite direction, operates the creeping ring which frictionally starts the pawl members to oscillate with it, this instantly producing locking engagement with the creeping ring 9 at which point such ring ceases to move and the oscillating ring begins to oscillate on the now stationary creeping ring 9, the frictional drag between the temporarily stationary constant form circular ring 9 and the oscillating ring being sufficient to properly damp the recoil action of the spring 3 which recoil action otherwise is likely to cause discomfort to the occupants of the vehicle.

It is thus seen that in my invention I provide inside the oscillating outer friction ring, a solid rigid circular constant form non-expansible ring, fitted to the outer ring friction-tight, with a definite predetermined frictional resistance between the outer ring and the inner ring, which resistance is practically sufficient for the shock-absorbing action, but will yield under an excessive resistance so that in practical operation the inner ring is made to creep under successive shock-absorbing actions, which cause locking and releasing operations to take place between the pawls and the inner ring.

Said inner ring, being fitted tightly to the outer oscillating ring, and furthermore being of a solid and rigid character, resists distortion or expansion, and the locking of the pawls relative to the inner ring has no effect upon the frictional resistance between the inner ring and the oscillating ring.

I claim:

1. A shock absorber comprising a base, an oscillating ring, a creeping ring in frictional engagement with the oscillating ring, and non-circular friction pawls between the base and the creeping ring, adapted to lock the creeping ring relative to the base, upon relative movement of the base and the oscillating ring in one direction, and to release the creeping ring upon the reverse movement, said pawls being so located and formed as to adapt them to maintain a virtually constant angle of thrust in order to compensate for wear.

2. In a shock absorber, the combination with a base, of a constant form floating ring rotatable relative to the base, an oscillating ring outside of the constant form floating ring, frictional means to cause predetermined friction between the oscillating ring and the constant form floating ring; and non-circular friction pawls between the base and the constant form, circular, floating ring, adapted to lock the constant form, circular, floating ring relative to the base upon oscillation of the oscillating ring in one direction, and to release the constant form floating ring on oscillation of the oscillating ring in the other direction, said pawls being so located and formed as to adapt them to maintain a virtually constant angle of thrust in order to compensate for wear.

3. In a shock absorber, the combination with a base and a constant form floating ring, of a pawl in locking articulation at one end with the base, and being provided at the other end with an involute contact face engaging the inner side of the constant form floating ring for the purpose of locking the ring and base against relative rotation in one direction, and to free said ring from the base upon relative rotation in the other direction, said pawl being so located and the involute face therein so formed as to adapt the strut to maintain a virtually constant angle of thrust in order to compensate for wear.

4. A shock absorber comprising a base; an oscillating ring; a constant form circular floating ring in frictional engagement with the oscillating ring; and non-circular friction pawls between the base and the constant form circular floating ring, adapted to lock the constant form circular floating ring relative to the base upon relative movement of the base and the oscillating ring in one direction, and to release the constant form circular floating ring upon the reverse movement.

5. In a shock absorber, the combination with a base, of a constant form circular floating ring rotatable relative to the base; an oscillating ring outside of the constant form circular floating ring; frictional means to cause predetermined friction between the oscillating ring and the constant form circular floating ring; and non-circular friction pawls between the base and the constant form circular floating ring, adapted to lock the constant form circular floating ring relative to the base upon oscillation of the oscillating ring in one direction, and to release the constant form circular floating ring on oscillation of the oscillating ring in the other direction.

6. In a shock absorber, the combination with a base and a constant form circular floating ring, of a friction pawl in locking articulation at one end with the base, and being provided at the other end with an involute contact face engaging the inner side of the constant form circular floating ring for the purpose of locking the ring and base against relative rotation in one direction, and to free said ring from the base upon relative rotation in the other direction.

7. In a shock absorber, the combination with a floating ring, a rotatably mounted contractable circular wall in frictional engagement with said floating ring inside the wall and a base, of non-circular friction pawl means operable by relative rotation of the wall to grip the floating ring and to effect frictional resistance between the floating ring and the circular wall.

8. In a shock absorber, the combination with a floating ring, a rotatably mounted contractable circular wall in frictional engagement with said constant form circular floating ring and a base; of non-circular friction pawl means in constant engagement with the ring and operable by relative rotation of the circular wall to effect frictional resistance between the circular wall and the ring upon movement in one direction and relieve such resistance upon movement in the other direction.

9. In a shock absorber, in combination, a base, an oscillating ring, a creeping ring in frictional engagement with the oscillating ring, and means interposed between the base and creeping ring for locking the latter against movement in one direction but permitting free movement in the opposite direction, said means including a plurality of pawls, the outer faces of which bear continually against said creeping ring and are so curved that the angle of thrust between the ring and each pawl remains constant for all conditions of wear of the parts.

10. In a shock absorber, in combination, a base, an oscillating ring, a creeping ring in frictional engagement with the oscillating ring, and means interposed between the base and creeping ring for locking the latter against movement in one direction but permitting free movement in the opposite direction, said means including a plurality of elongated pawl members extending in a generally radial direction, the outer faces of which members bear continually against said creeping ring and are so curved that the angle of thrust between the ring of each pawl remains constant for all conditions of wear of the parts.

11. In a shock absorber, in combination, a base, an oscillating ring, a creeping ring in frictional engagement with the oscillating ring, and means interposed between the base and creeping ring for locking the latter against movement in one direction but permitting free movement in the opposite direction, said means including a plurality of pawls each mounted to swing or rock about a fixed axis and the outer faces of which bear continually against said creeping ring and are so curved that the angle of thrust between the ring of each pawl remains constant for all conditions of wear of the parts.

12. In a shock absorber, in combination, a base, an oscillating ring, a creeping ring in frictional engagement with the oscillating ring, and means interposed between the base and creeping ring for locking the latter against movement in one direction but permitting free movement in the opposite direction, said means including a plurality of pawls, the outer ends of which are provided with involute contacts faces engaging the creeping ring, said contact faces bearing continuously against said creeping ring.

13. In a shock absorber, in combination, a base, an oscillating ring, a creeping ring in frictional engagement with the oscillating ring, and means interposed between the base and creeping ring for locking the latter against movement in one direction but permitting free movement in the opposite direction, said means including a plurality of pawls supported to rock about fixed axes, said pawls having outer contact faces in constant contact with said creeping ring, and said contact faces being so curved that the point of contact between the pawl and creeping ring at all times lies to one side of the radius of the creeping ring which passes through the pivotal axis of the pawl.

14. In a shock absorber, the combination of three relatively rotatable members, one of which is provided with radial ways; pawl seats in said radial ways; a self centering abutment for the pawl seats; and friction pawl actuating means operating between said pawl seats and another of the rotatable members to produce friction between the last mentioned rotatable member and the third member upon movement of said third member in a predetermined direction.

15. In a shock absorber the combination with a base, a floating ring rotatable relative to the base, and an oscillating ring frictionally engaging the floating ring; of a plurality of pawl seats; a self centering abutment for the pawl seats; and friction pawls operating between the pawl seats and the floating ring to lock the floating ring relative to the base upon movement of the oscillating ring in one direction, and to free the floating ring from the base upon movement of the oscillating ring in the other direction; and resilient means to retain the friction pawls in operative position.

16. In a shock absorber the combination with a base, a floating ring rotatable relative to the base, and an oscillating ring frictionally engaging the floating ring; of a plurality of pawl seats; a self centering abutment for the pawl seats; and friction pawls operating between the pawl seats and the floating ring to lock the floating ring relative to the base upon movement of the oscillating ring in one direction, and to free the floating ring upon movement of the oscillating ring in the other direction.

17. In a shock absorber the combination with a base, a floating ring rotatable relative to the base, and an oscillating ring frictionally engaging the floating ring; of means to regulate the friction between the oscillating ring and the floating ring; a plurality of pawl seats; a self centering abutment for the pawl seats; friction pawls operating between the pawl seats and the floating ring to lock the floating ring relative to the base upon movement of the oscillating ring in one direction, and to free the floating ring from the base upon movement of the oscillating ring in the other direction; and resilient means to hold the friction pawl in operative position.

In testimony whereof, I have hereunto set my hand at Los Angeles, California, this 7th day of April, 1919.

JAMES PIERCE BALDWIN.

Witness:
 M. BEULAH TOWNSEND.